April 28, 1953 — H. PRANG — 2,636,628
DETACHABLE UNLOADER
Filed Oct. 7, 1950 — 2 SHEETS—SHEET 1

INVENTOR.
HAROLD PRANG
BY Keith Misegades
ATTORNEY

April 28, 1953 — H. PRANG — 2,636,628
DETACHABLE UNLOADER
Filed Oct. 7, 1950 — 2 SHEETS—SHEET 2

INVENTOR.
HAROLD PRANG
BY Keith Misegades
ATTORNEY

Patented Apr. 28, 1953

2,636,628

UNITED STATES PATENT OFFICE 2,636,628

DETACHABLE UNLOADER

Harold Prang, Perth Amboy, N. J.

Application October 7, 1950, Serial No. 189,023

8 Claims. (Cl. 214—509)

This invention relates to a device for unloading finely divided solid material from bulk transport vehicles.

Many such devices have been proposed but, so far as is known, they fall into but two classes: devices self-contained and separately transportable and devices that are an integral part of the vehicle. Both of these have definite disadvantages. A separate unloader must be licensed as such in order to be taken over the road; it must be built to travel as rapidly as a highway truck if it is to be towed along with the material to be unloaded. If it is self-propelled, another operator must be paid. Also, many states limit the length of the overall truck plus trailing unloader. For these reasons and others, separate unloaders have limited utility.

In the present scheme of taxation, taxes on large vehicles, to which unloaders are particularly adapted, amount to several thousand dollars a year so that it is essential that the vehicle be in constant use in order that it may earn a profit. This means that the owner must be prepared to carry any load that is offered to him, whether massive or granular. Most integrally-built unloading devices contemplate constant use of the vehicle for hauling granular material only and hence are uneconomical where it is not possible to keep a truck engaged in this single type of duty, since the unloader reduces the amount of payload that may be carried when the truck is devoted to the carrying of massive material.

The device of the present invention is intended to be detachably mounted on the rear of a truck or trailer of the type that is emptied by raising the front end thereof to allow the granular contents to pour out of a door or gate in the rear of the body. The unloader will rapidly raise the discharged granular material from the discharge opening to a height somewhat above the vehicle body. For example, it may be used to load another, smaller truck. It may be carried on the rear of the vehicle to which it is attached without slackening the speed thereof or interfering with its clearance. It may be removed from the vehicle with little effort and, when it is removed the vehicle may be used as easily as if it had never had any attachment.

The invention may best be understood by reference to the accompanying drawings forming part of this specification in which.

Figure 1:
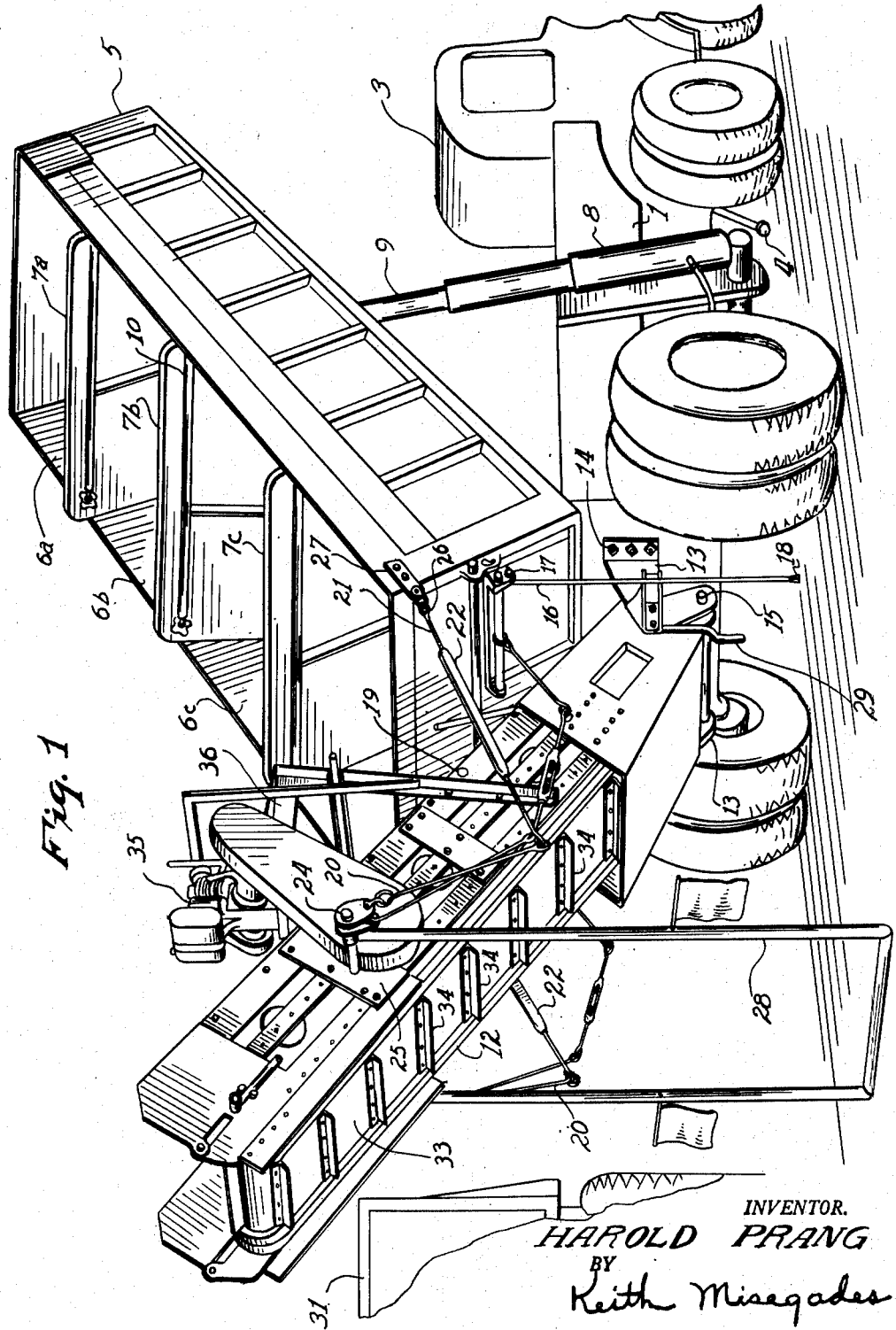
Figure 1 is a partial side elevation of a semi-trailer showing the invention applied thereto in unloading position.
Figure 2:
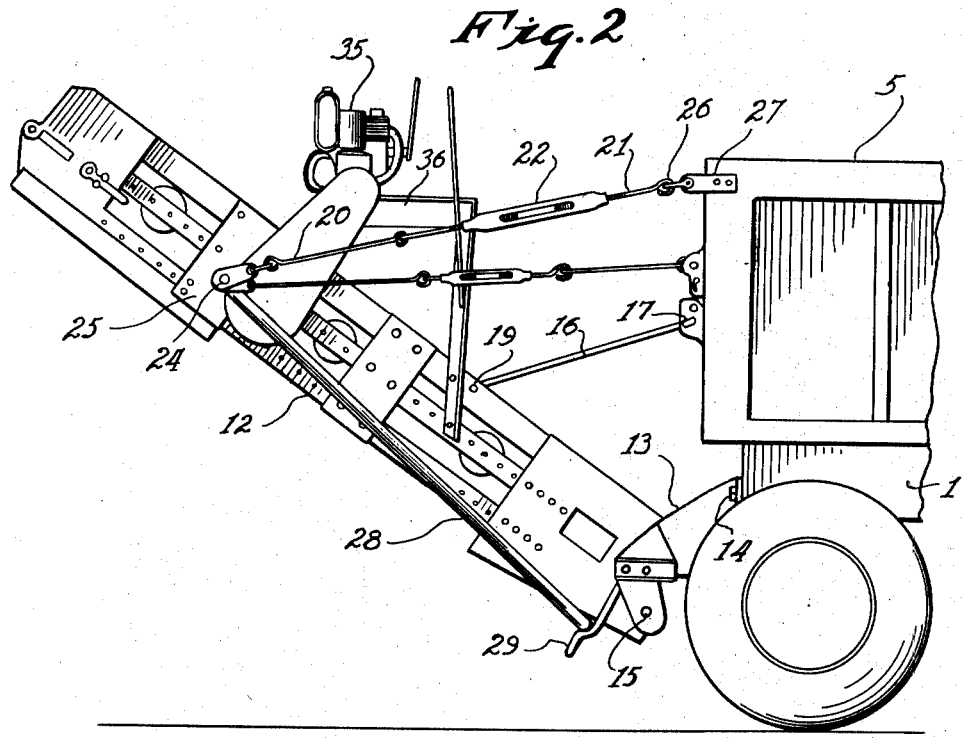
Figure 2 is a side elevation of the device as it is carried along the highway and Figure 3 is a plan view corresponding to Figure 2.
Figure 3:
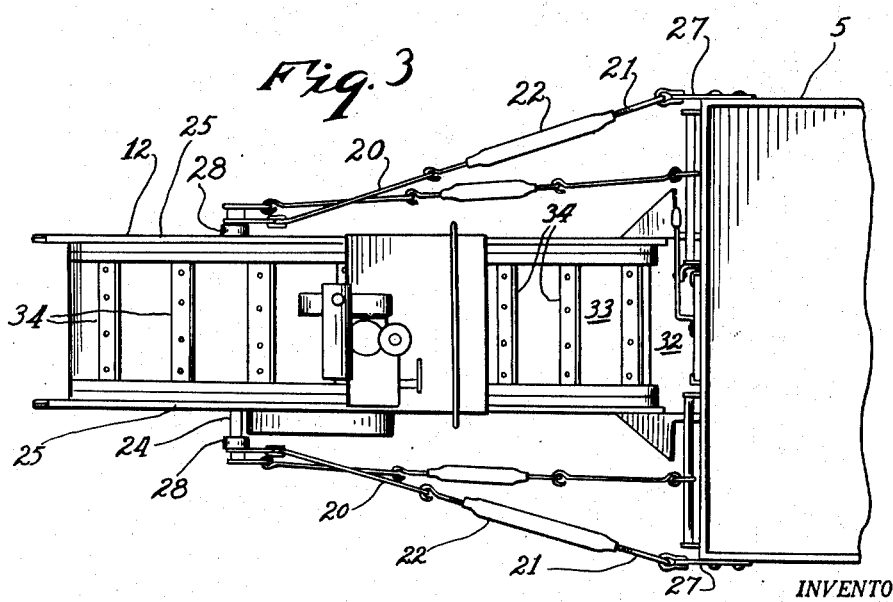

In the drawings, there is shown a semi-trailer comprising a frame 1. Numeral 3 indicates portions of the towing vehicle. When the trailer is not being towed, it may be supported by props 4.

On the frame 1 of the trailer is mounted a body 5 which may be divided into any suitable number of compartments 6a, b, c by movable partitions 7a, b, c. Such partitions are secured swingably to the body in conventional manner. When the body 5 is tipped rearwardly by hydraulic cylinders having a body portion 8, attached to the frame 1 and pistons 9, operating on the trailer body, the partitions 7 as shown at 7b pivot at 10, allowing the load to slide out below the lower ends of the partitions. The load is discharged through rear doors 11 which slides up and down in suitable guides.

The unloading conveyor 12 is mounted on a pair of brackets 13, secured to the rear portion of the trailer frame 1 by bolts 14. These constitute the main connection of the conveyor to the trailer frame and their removal leaves the trailer free of the unloader. The unloader, of the continuous belt type, is pivoted on the brackets 13, about shaft 15.

In its inoperative position the conveyor is carried above the road by firmly securing it to the upper portion of the trailer body. Two or more rods 16 pivoted to the body at 17, are provided with half journals 18 to engage crosspiece 19 thus holding the conveyor at the desired distance outwardly from the body and above the road surface. The conveyor is drawn toward the body by means of links 20 and 21, the inner link being provided with a turnbuckle 22. The outer links 20 are secured to the conveyor frame by lugs 23, attached to cross-shaft 24 in the conveyor frame 25. The inner links 21 are held on the body by eyes 26 and bolts, secured to body lugs 27 on the upper portion of the body. By placing the half-journals 18 against the crosspiece 19 and tightening the turnbuckles 22, the conveyor is held rigidly out in the rear of the trailer, secure against movement relative to the trailer during travel over the road. It will be obvious that instead of the links and turnbuckles, other equivalent means for detachably securing the conveyor in fixed position may be employed so long as the desired end is attained. For example, a drum and cable may be used.

When it is desired to unload the contents of the body, the H frame 28, pivoted about cross shaft 24 is released from catches 29 permitting it to swing down to engage the ground. The turnbuckles are slacked off and the stiffening rods 16 are dropped against the body. If desired, means may also be provided for resting upon, catching or otherwise engaging the receiving bin, which, in this case, is shown to be another truck 31 being loaded from the trailer.

The trailer body is elevated by actuating the hydraulic lifts 8 and 9, either in stages or all at once. The door 11 is lifted and the load spills out on apron 32 which directs the particles of the load to the conveyor belt 33. The belt is provided with flights 34 for engaging and carrying forward the particles, in the manner common to such conveyors.

As shown, the conveyor is driven by a small engine 35 mounted on a framework 36 on the upper side of the conveyor. This is convenient since it is expected that the conveyor will be detached from the trailer from time to time and by using the separate engine, the additional bother of uncoupling a power take-off is avoided. However, where it is less expensive to employ a power take-off connected to the prime mover, such may be employed if desired.

It will be seen that a device has been provided that may be converted from loading to unloading position or the reverse with little effort or loss of time. When returned to inactive position it is rigidly secured to the trailer body so that the vehicle may be driven at normal speeds and without observing any special precautions. The whole assembly may be removed from the trailer with little effort by pulling bolts 14, the bolts from the eyes 26 and detaching stiffening rods 16. The trailer is then free of all connection with the unloader so that it may be used for hauling goods not requiring the use of an unloader.

It will be obvious that the invention, although shown herein attached to a semi-trailer, may be as easily attached to any other suitable type of vehicle. It will also be obvious that many other modifications may be made within the spirit of the invention as set forth in the claims that follow.

What is claimed is:

1. The combination of a vehicle for carrying loose particulate material, which vehicle dumps from the rear by raising the front end and an unloading conveyor readily detachable therefrom which includes said vehicle and conveyor, a stiff arm swung from the rear of the vehicle, a seat for the opposite end of said arm on the outer part of said conveyor, traction means connecting the outer part of the conveyor with the rear of the vehicle, a pivotal mounting for the inner end of the conveyor on the vehicle; the mounting, arm, seat and traction means cooperating when traction is applied to rigidly fix the conveyor to the vehicle and when traction is released to permit the conveyor to swing vertically about the pivot; the mounting, arm and traction means being detachably secured to the vehicle for ready removability.

2. The combination of a vehicle for carrying loose particulate material, which vehicle dumps from the rear by raising the front end and an unloading conveyor readily detachable therefrom which includes said vehicle and conveyor, a plurality of stiff arms swung from the rear of the vehicle, a seat for each opposite end of said arms on the outer part of said conveyor, traction means connecting the outer part of the conveyor with the rear of the vehicle, a pivotal mounting for the inner end of the conveyor on the vehicle; the mounting, arms, seats and traction means cooperating when traction is applied to rigidly fix the conveyor to the vehicle and when traction is released to permit the conveyor to swing vertically about the pivot; the mounting and traction means being detachably secured to the vehicle for ready removability.

3. The combination of a vehicle for carrying loose particulate material, which vehicle dumps from the rear by raising the front end and an unloading conveyor readily detachable therefrom which includes said vehicle and conveyor, a stiff arm swung from the rear of the vehicle, a seat for the opposite end of said arm on the outer part of said conveyor, traction means including a plurality of links and a turnbuckle connecting the outer part of the conveyor with the rear of the vehicle, a pivotal mounting for the inner end of the conveyor on the vehicle; the mounting, arm, seat and traction means cooperating when traction is applied to rigidly fix the conveyor to the vehicle and when traction is released to permit the conveyor to swing vertically about the pivot; the mounting and traction means being detachably secured to the vehicle for ready removability.

4. The combination of a vehicle for carrying loose particulate material, which vehicle dumps from the rear by raising the front end and an unloading conveyor readily detachable therefrom which includes said vehicle and conveyor, a stiff arm swung from the rear of the vehicle, a seat for the opposite end of said arm on the outer part of said conveyor, traction means connecting the outer part of the conveyor with the rear of the vehicle, a pivotal mounting for the inner end of the conveyor on the vehicle; the mounting, arm, seat and traction means cooperating when traction is applied to rigidly fix the conveyor to the vehicle and when traction is released to permit the conveyor to swing vertically about the pivot; a door in the rear wall of the vehicle providing egress for the contents thereof, an apron fixed below the door for directing the outflowing contents upon the conveyor; the mounting and traction means being detachably secured to the vehicle for ready removability.

5. An unloading conveyor for detachable mounting on a vehicle that dumps from the rear by raising the front end thereof, which conveyor includes a stiff arm swingably mounted upon the rear of said vehicle, a seat for the opposite end of said arm on the outer part of the conveyor, traction means for connecting the outer part of the conveyor with the rear of said vehicle, pivotal mounting means for the conveyor for attachment to the rear of the vehicle; the mounting, arm, seat and traction means cooperating, when said mounting, arm and traction means are mounted on and attached to said vehicle and when traction is applied, to rigidly fix the conveyor to the vehicle and when traction is released, to permit the conveyor to swing vertically about the pivot; the means for securing the mounting, arm and traction means to said vehicle being adapted for ready attachment and removability.

6. An unloading conveyor for detachable mounting on a vehicle that dumps from the rear by raising the front end thereof, which conveyor includes a pair of stiff arms swingably mounted upon the rear of said vehicle, a pair of corresponding seats for said arms on the outer part of the conveyor, traction means for connecting the outer part of the conveyor with the rear of said vehicle, pivotal mounting means for the conveyor for attachment to the rear of the vehicle; the mounting, arms, seats and traction means cooperating, when said mounting, arms and traction means are mounted on and attached to said vehicle and when traction is applied, to rigidly fix the conveyor to the vehicle and when traction is released, to permit the conveyor to swing vertically about the pivot; the means for securing the mounting, arms and traction means to said vehicle being adapted for ready attachment and removability.

7. The combination of a vehicle for carrying loose particulate material with a conveyor pivoted near the base of the body of the vehicle for movement toward and away from the vehicle, traction means connecting the outer part of the conveyor with the upper rear portion of the vehicle, seats on the outer part of the conveyor and the upper rear portion of the vehicle and a stiff arm adapted to be seated on said seats and cooperating with the traction means to hold the conveyor firmly outward of the rear of the vehicle.

8. The combination of a vehicle for carrying loose particulate material, which vehicle dumps from the rear by raising the front end and an unloading conveyor readily detachable therefrom, which includes said vehicle and conveyor, seats on the rear of the vehicle and on the outer part of the conveyor, a stiff arm adapted to be supported between said seats; tractor means connecting the outer part of the conveyor with the rear of the vehicle; a pivotal mounting for the inner end of the conveyor on the vehicle; the mounting, arm, seats and traction means cooperating when traction is applied, to rigidly fix the conveyor to the vehicle and when traction is released, to permit the conveyor to swing vertically about the pivot.

HAROLD PRANG.

References Cited in the file of this patent

UNITED STATES PATENTS

| Number | Name | Date |
|---|---|---|
| 400,270 | Thorpe | Mar. 26, 1889 |
| 710,611 | Ray | Oct. 7, 1902 |
| 725,095 | Kreutler et al. | Apr. 14, 1903 |
| 897,462 | Hanak | Sept. 1, 1908 |
| 1,448,635 | Egger | Mar. 20, 1923 |
| 1,515,329 | Barkmann et al. | Nov. 11, 1924 |
| 2,262,404 | Pavliska | Nov. 11, 1941 |
| 2,275,799 | Oklejas | Mar. 10, 1942 |
| 2,325,492 | Erickson | July 27, 1943 |
| 2,419,824 | Davis | Apr. 29, 1947 |
| 2,431,000 | Step | Nov. 18, 1947 |
| 2,490,241 | Smith et al. | Dec. 6, 1949 |